(12) United States Patent
Tejada-Gamero et al.

(10) Patent No.: US 8,751,575 B2
(45) Date of Patent: Jun. 10, 2014

(54) SYSTEM AND METHOD FOR GENERATING A GHOST PROFILE FOR A SOCIAL NETWORK

(75) Inventors: Eduardo Jose Tejada-Gamero, Belo Horizonte (BR); Eduardo Thuler, Belo Horizonte (BR); Diego de Assis Monteiro Fernandes, Belo Horizonte (BR); Fernando Antonio Fernandes, Jr., Belo Horizonte (BR); Bruno Maciel Fonseca, Belo Horizonte (BR)

(73) Assignee: Google Inc., Mountain View, CA (US)

( * ) Notice: Subject to any disclaimer, the term of this patent is extended or adjusted under 35 U.S.C. 154(b) by 52 days.

(21) Appl. No.: 13/246,724

(22) Filed: Sep. 27, 2011

(65) Prior Publication Data

US 2012/0079023 A1      Mar. 29, 2012

Related U.S. Application Data

(60) Provisional application No. 61/386,929, filed on Sep. 27, 2010.

(51) Int. Cl.
*G06F 15/16*     (2006.01)

(52) U.S. Cl.
USPC ........... 709/204; 713/150; 715/751; 715/759; 455/410; 455/411; 380/247

(58) Field of Classification Search
USPC .................. 709/204; 713/150; 715/751, 759; 455/410, 411; 380/247
See application file for complete search history.

(56) References Cited

U.S. PATENT DOCUMENTS

| | | |
|---|---|---|
| 6,130,938 A | 10/2000 | Erb |
| 6,192,119 B1 | 2/2001 | Wilson |
| 6,697,478 B1 | 2/2004 | Meldrum et al. |
| 6,754,322 B1 | 6/2004 | Bushnell |
| 7,106,848 B1 | 9/2006 | Barlow et al. |
| 7,366,990 B2 | 4/2008 | Pitroda |
| 7,555,110 B2 | 6/2009 | Dolan et al. |
| 7,610,287 B1 | 10/2009 | Dean et al. |
| 7,742,468 B2 | 6/2010 | Vagelos |
| 2002/0137490 A1 | 9/2002 | Gallant |
| 2002/0143874 A1 | 10/2002 | Marquette et al. |

(Continued)

FOREIGN PATENT DOCUMENTS

| | | |
|---|---|---|
| JP | 2007-287131 | 11/2007 |
| KR | 10-2009-0017281 | 2/2009 |
| WO | WO02079984 | 10/2002 |

OTHER PUBLICATIONS

Adamic et al., "A Social Network Caught in the Web," Internet Journal, First Monday, Jun. 2, 2003, pp. 1-22, vol. 8, No. 6.

(Continued)

*Primary Examiner* — Jason K. Gee
*Assistant Examiner* — Sharif E Ullah
(74) *Attorney, Agent, or Firm* — Patent Law Works LLP

(57) ABSTRACT

A system and method for generating a ghost profile is disclosed. The ghost profile allows a user to use certain features in a social network without converting to a social network profile. Specifically, the ghost profiles are unsearchable and comments that originate from a ghost profile user are displayed as partial names. The ghost profile is generated when a member of the social network invites a user to join. In one example, the member is automatically added as a friend to the user's ghost profile.

21 Claims, 21 Drawing Sheets

(56) References Cited

U.S. PATENT DOCUMENTS

| | | | |
|---|---|---|---|
| 2003/0028596 | A1* | 2/2003 | Toyota et al. .............. 709/204 |
| 2004/0258220 | A1 | 12/2004 | Levine et al. |
| 2005/0152521 | A1 | 7/2005 | Liljestrand |
| 2006/0026288 | A1 | 2/2006 | Acharya et al. |
| 2006/0077957 | A1 | 4/2006 | Reddy et al. |
| 2006/0184997 | A1* | 8/2006 | La Rotonda et al. ........... 726/2 |
| 2006/0206604 | A1 | 9/2006 | O'Neil et al. |
| 2007/0127631 | A1 | 6/2007 | Difiglia |
| 2007/0162458 | A1 | 7/2007 | Fasciano |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |
| 2008/0056475 | A1 | 3/2008 | Brannick et al. |
| 2008/0192656 | A1 | 8/2008 | Vagelos |
| 2008/0228824 | A1* | 9/2008 | Kenedy et al. ........... 707/104.1 |
| 2009/0069034 | A1* | 3/2009 | Abhyanker .............. 455/456.3 |
| 2009/0070852 | A1 | 3/2009 | Chijiiwa et al. |
| 2010/0088246 | A1* | 4/2010 | Lim .............................. 705/319 |
| 2010/0199356 | A1* | 8/2010 | Krishnamurthy et al. ...... 726/26 |
| 2011/0098156 | A1 | 4/2011 | Ng et al. |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, pp. 252-255, London, United Kingdom.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, May 13, 2011, 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 8, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twigger, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

International Search Report and Written Opinion for PCT/US2011/053526 mailed Jan. 3, 2013, 10 pages.

* cited by examiner

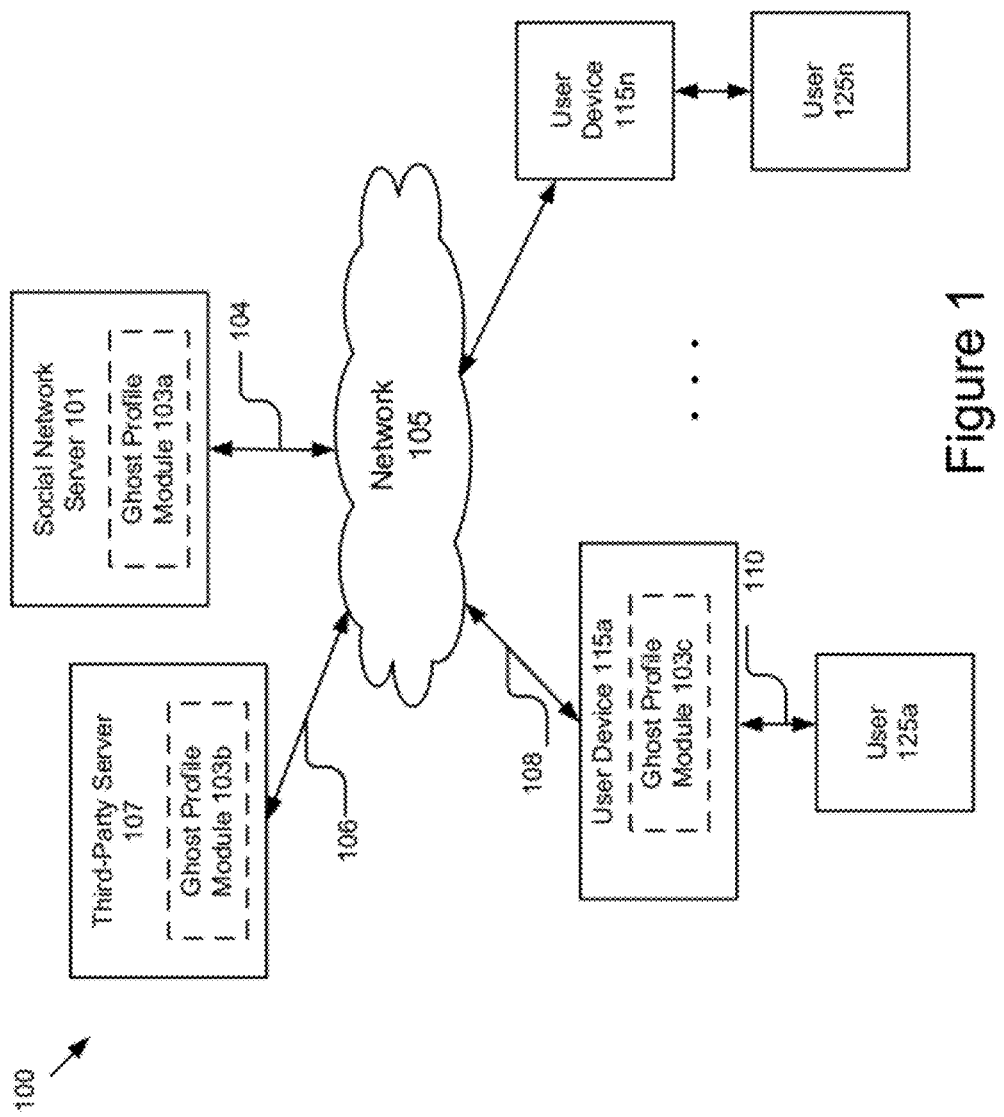

Figure 6  Long-term version

Figure 7 (prior art)

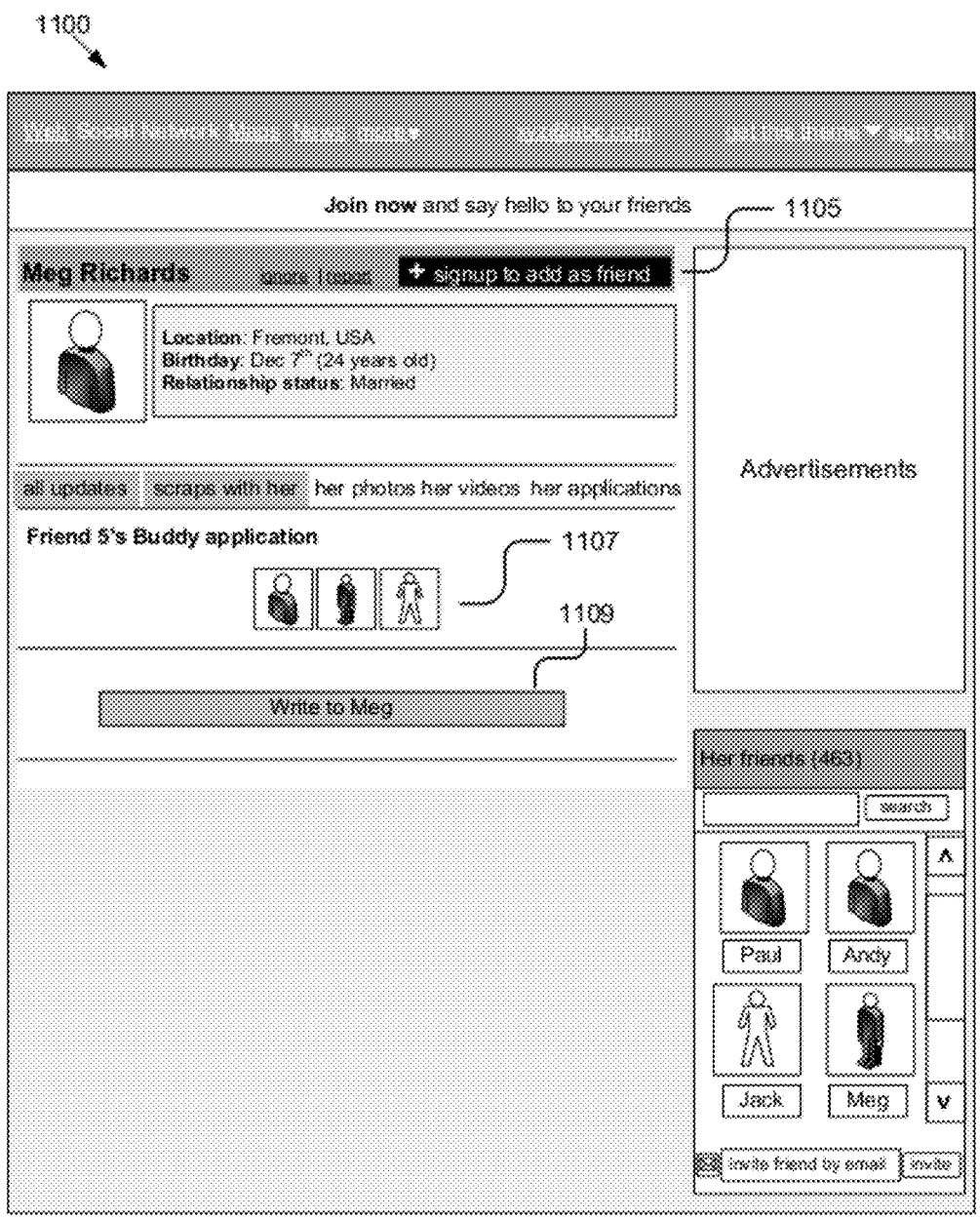
Figure 11   Non-Friends profile

1200

Hi,
Some friends, including Meg Richards, invited you to social network. You can see below some of her recent updates. 1204

If you don't wish to receive future messages we can stop sending you this digest.

➢ Friend request from Avneet Sai

---

Birthday reminder: —— 1210    Friend suggestion: —— 1208
Friend 1 (Feb 12)                  Tony Xavier
Friend 2 (Feb 13)                  Francis Xavier

---

Updates from your friends on social network

Friend 2, Friend 3 and 3 others added a new video:

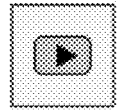 Best songs of the year – HD Quality

Friend 5 updated about me and relationship status

Friend 4 did a street dance with Friend 3 (via Buddyapplication! – more applications)

Friend 6 added 3 new photo to the album Wedding!!

Friend 6 applied Underwater theme to his profile.

You can also view recent updates.

Social Network  This has been sent to dcba@xyz.com. If you don't want to receive newsletters from social network anymore, unsubscribe now. For questions, please visit our Help Center.

Figure 12                           Mail digest
                                         1206

1300

Hi,

Some friends, including Meg Richards, invited you to social network. You can see below some of her recent updates.

If you don't wish to receive future messages we can stop sending you this digest.

➢ Friend request from Avneet Sai

| Birthday reminder: | Friend suggestion: |
|---|---|
| Friend 1 (Feb 12) | Tony Xavier |
| Friend 2 (Feb 13) | Francis Xavier |

Updates from your friends on social network

Friend 2, Friend 3 and 3 others added a new video:

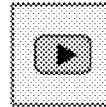 Best songs of the year – HD Quality

Friend 5 updated about me and relationship status

Friend 4 did a street dance with Friend 3 (via Buddy application! – more applications)

Friend 6 added 3 new photo to the album Wedding!!

Friend 6 applied Underwater theme to his profile.

You can also view recent updates on a trusted computer (which only you access), or on a shared computer (which others also access).

— 1303

Social Network — This has been sent to dcba@xyz.com. If you don't want to receive newsletters from social network anymore, unsubscribe now. For questions, please visit our Help Center.

Figure 13          Mail digest

1400

Hi, 

Your friend Ram, who is a social network user sent you this email.
Recent updates on a trusted computer (which only you access): http//goo/gl/xxxxx
Recent updates on a shared computer (which others also access): http//goo/gl/yyyyy ---
Reminders:

- 1 friend request : Avneet Sai
- Birthdays: Friend 1 (Feb 12) and Friend 2 (Feb 13).
- Friends suggestion: Tony Xavier and Francis Xavier.

---
Updates from your friends on social network:

- Friend 2, Friend 3 and 3 others added a new video: Best songs of the year -- HD Quality
- Friend 5 updated about me and relationship status
- Friend 6 added 3 new photos to the album Wedding!!
- Friend 6 applied Underwater theme to his profile.

---
This email was sent to qwert@xyz.com
Stop sending me e-mails: http://gpp.gl/zzzzz
Help Center: http://gpp.gl/xyzxyz Figure 14          Mail digest

SYSTEM AND METHOD FOR GENERATING A GHOST PROFILE FOR A SOCIAL NETWORK

CROSS-REFERENCE TO RELATED APPLICATIONS

This application claims priority under 35 U.S.C. §119(e) to U.S. Provisional Patent Application No. 61/386,929, filed on Sep. 27, 2010, entitled "System and Method for Generating a Ghost Profile for a Social Network" which is herein incorporated by reference in its entirety.

BACKGROUND

The specification relates to a social network. In particular, the specification relates to generating a ghost profile in a social network for users to participate in social networking activities without providing user information.

Social networks have become a popular tool for communicating with other people. Americans, for example, spend a quarter of their time online on social networks including blogs. Some people are concerned about creating profiles in social networks, however, because they are concerned that their privacy might be compromised. In addition, users do not want to take the time to fill out all their information and click multiple links to access information on a social network.

Thus a problem arises when users of social networks are friends with people that are opposed to social networks. The second group misses out on an important social component. For example, many users only share their photos on a social networking site. As a result, users that do not want to join the social network are forced to either join with reservations or miss out on the social component, such as viewing pictures.

SUMMARY OF THE INVENTION

The specification overcomes the deficiencies and limitations of the prior art at least in part by providing a system and method for establishing a ghost profile in a social network. In one embodiment, the ghost profile application includes a social network application, a ghost profile engine, an invitation engine, a graphical user interface module and a search engine. The social network application generates and manages social network profiles. The ghost profile engine generates and manages ghost profiles. In one embodiment, the ghost profile engine adds a profile type field to the ghost profile. This makes it easier for the search engine to filter out the ghost profiles. In one embodiment, the ghost profile engine generates the ghost profile in response to receiving a request from a member. In one embodiment, the ghost profile engine adds the member as a friend of the ghost profile user. The ghost profile is visible to the friend, but not to other users.

The ghost profiles are not visible to other users and cannot be searched. This way the ghost profile user will be able to experience the advantages of the social network without the pressure of joining and, after using some of the functions of the ghost profile, will be encouraged to join. In response to a user request, the ghost profile engine converts the ghost profile to a social network profile for full access to all the social network functions.

The invitation engine generates and transmits an invitation to a user that contains a link to the ghost profile. In one embodiment, once the ghost profile engine receives a confirmation that the user selected the link, the ghost profile engine assigns a unique identifier to the ghost profile. This is advantageous over assigning the unique identifier at the same time that the ghost profile is created because some users will not click on the link, which reduces the pool of unique identifiers.

The graphical user interface module generates a user interface for displaying the ghost profile. The search engine searches for profiles and filters out ghost profiles. In one embodiment, the search engine scores ghost profiles as zero and filters the zero-scored profiles from the final results list. In one embodiment, the graphical user interface module only displays a partial name for the ghost profile user so that only the user's friends will recognize the user's activities. In one embodiment, the ghost profile user's email address is the username and, as a result, the email address is obfuscated.

BRIEF DESCRIPTION OF THE DRAWINGS

The specification is illustrated by way of example, and not by way of limitation in the figures of the accompanying drawings in which like reference numerals are used to refer to similar elements.

FIG. 1 is a high-level block diagram illustrating one embodiment of a ghost profile module that is stored on various entities in a social network.

FIG. 7 is a prior art illustration of an example of social network notification settings received by a friend.

FIG. 11 is an illustration of a non-friend's profile in a social network according to one embodiment.

FIG. 12 is an illustration of an email invitation sent from a member of a social network to a non-member according to one embodiment.

FIG. 13 is an illustration of an email invitation sent from a member of a social network to a non-member that provides additional security options according to one embodiment.

FIG. 14 is an illustration of another embodiment of an email invitation sent from a member of a social network to a non-member according to one embodiment.

DETAILED DESCRIPTION

Figure 2A:
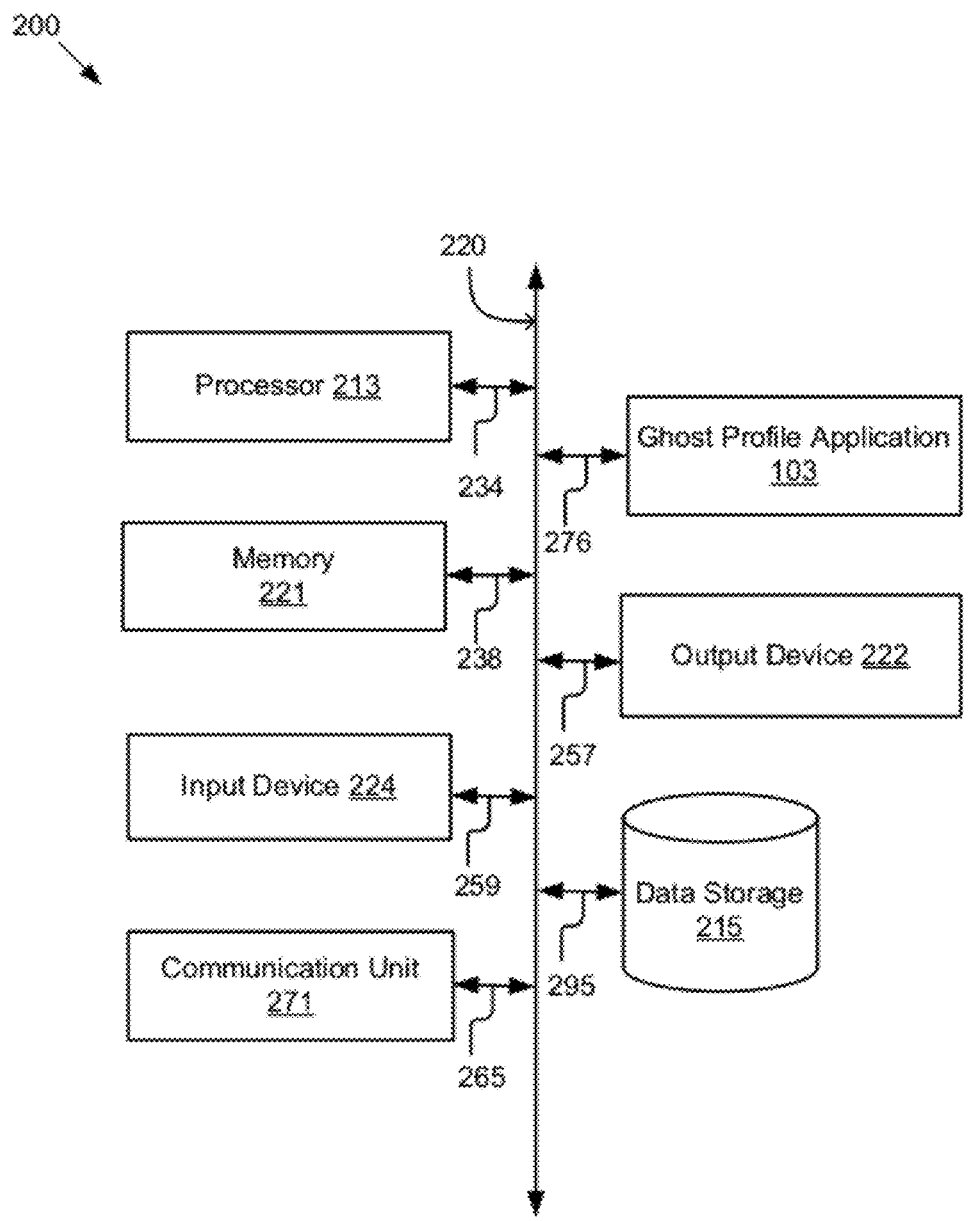
FIG. 2A is a block diagram illustrating one embodiment of the ghost profile module.

A system and method for establishing a ghost profile in a social network is described. In the following description, for purposes of explanation, numerous specific details are set forth in order to provide a thorough understanding of the specification. It will be apparent, however, to one skilled in the art that the specification can be practiced without these specific details. In other instances, structures and devices are shown in block diagram form in order to avoid obscuring the description. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment in the specification. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

System Overview

FIG. 1 illustrates a block diagram of a social network system 100 according to one embodiment. A social network is any type of social structure where the users are connected by a common feature, for example, Orkut. The common feature includes friendship, family, a common interest, etc. In FIG. 1 and the remaining figures, a letter after a reference number, such as "115a" is a reference to the element having that particular reference number. A reference number in the text without a following letter, such as "115," is a general reference to any or all instances of the element bearing that reference number. In the illustrated embodiment, these entities are communicatively coupled via a network 105.

The social network system 100 includes user devices 115a . . . 115n that are accessed by users 125a . . . 125n, a social network server 101 and a third-party server 107. In the illustrated embodiment, these entities are communicatively coupled via a network 105. The user devices 115a . . . 115n in FIG. 1 are used by way of example. While FIG. 1 illustrates two devices, the description applies to any system architecture having one or more user devices. Furthermore, while only one network 105 is coupled to the user devices 115a . . . 115n, the social network server 101 and the third party application 107, in practice any number of networks 105 can be connected to the entities.

In one embodiment, the ghost profile module 103a is stored on the social network server 101, which is coupled to the network 105 via signal line 104. In another embodiment, the ghost profile module 103b is stored on a third-party server 107, which is coupled to the network 105 via signal line 106. In yet another embodiment, the ghost profile module 103 is stored on a user device 115, which is coupled to the network 105 via signal line 108. Persons of ordinary skill in the art will recognize that the ghost profile module 103c can be stored in any combination on the devices and servers.

In another embodiment, the ghost profile module 103b is stored on the third-party server 107. The third-party server 107 is any server that is not the social network server 101. For example, in one embodiment, the third-party server 107 generates a webpage and includes a snippet of code for displaying a ghost profile to add a social element to the webpage.

In yet another embodiment, the ghost profile module 103c is stored on the user device 115. The user device 115 is any computing device that includes a personal computer ("PC"), a cell phone (e.g., a smart phone, a feature phone, a dumb phone, etc.), a tablet computer (or tablet PC), a laptop, etc. One having ordinary skill in the art will recognize that other types of user devices 115a . . . 115n are possible. In one embodiment, the system 100 comprises a combination of different types of user devices 115a . . . 115n. In one embodiment, the user device 115 is a cell phone and the activity stream application 103b is a thin client that accesses data that is remotely stored in the social network server 101 via the network 105. The user 125a is communicatively coupled to the user device 115a via signal line 110.

In one embodiment, the network 105 is a partially public or a wholly public network such as the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial—or satellite-based transceivers). In one embodiment, the network 105 is an IP-based wide or metropolitan area network.

The ghost profile module 103 generates a ghost profile for a person that is not registered as a member. In one embodiment, the ghost profile module 103 generates a ghost profile for users that do not want to join a social network. The ghost profile achieves three goals: (1) the ghost profile is not part of the social graph, i.e. the ghost profile is not visible on the social network to anyone except friends of the ghost profile user; (2) the ghost profile and anything associated with the ghost profile user is not accessible through a link; and (3) the ghost profile is not searchable. These features allow the user to maintain privacy while determining whether to join the social network as a member.

Computing Device 200

Referring now to FIG. 2A, a computing device 200 is shown in more detail. FIG. 2A is a block diagram of a computing device 200 that includes a processor 213, a memory 221, a ghost profile application 103, an output device 222, an input device 224, a communication unit 271 and data storage 215. In one embodiment, the computing device 200 is a social network server 101. In another embodiment, the computing device 200 is a third-party server 107. In yet another embodiment, the computing device 200 is a user device 115.

The processor 213 comprises an arithmetic logic unit, a microprocessor, a general purpose controller or some other processor array to perform computations and provide electronic display signals to a display device. The processor 213 is coupled to the bus 220 for communication with the other components via signal line 234. Processor 213 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 221 stores instructions and/or data that may be executed by processor 213. The memory 221 is coupled to the bus 220 for communication with the other components via signal line 238. The instructions and/or data may comprise code for performing any and/or all of the techniques described herein. The memory 221 may be a dynamic random access memory (DRAM) device, a static random access memory (SRAM) device, flash memory or some other memory device known in the art. In one embodiment, the memory 221 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The storage 215 is a non-transitory memory that stores data such as a social graph 246 and profiles 245. The storage device 215 stores instructions and/or data that are executed by the processor 213. The storage device 215 is communicatively coupled to the bus 220 for communication with the other components of the computing device 200 via signal line 295.

The communication unit 271 receives data from a data source and transmits the data to the ghost profile application 103. The communication unit 271 is coupled to the bus 220 via signal line 265. In one embodiment, the communication unit 271 includes a wireless transceiver for exchanging data with the network 105, or with another communication channel, using one or more wireless communication methods, such as IEEE 802.11, IEEE 802.16, BLUETOOTH® or another suitable wireless communication method. In another embodiment, the communication unit 271 includes a cellular communications transceiver for sending and receiving data over a cellular communications network such as via short messaging service (SMS), multimedia messaging service (MMS), hypertext transfer protocol (HTTP), direct data connection, WAP, email, etc. In another embodiment, the communication unit 271 includes a port for direct physical connection to the network 105 or to another communication channel. For example, the communication unit 271 includes a USB, SD, CAT-5 or similar port for wired communication with the network 105. In one embodiment, the communication unit 271 includes a global positioning system (GPS) receiver that determines position data, e.g. digital latitude longitude and elevation data, based on GPS data received from GPS satellites. Alternatively, the communication unit 271 receives information from cellular towers that provide a triangulation mechanism. In another embodiment, communication unit 271 receives signal strength measurements from known locations of WiFi access points or BlueTooth devices.

The input device 224 is a keyboard, keypad, input buttons, microphone, etc. In one embodiment, the input device 224 is a voice recording device that is configured to capture audio signals and output the captured audio signals in digital form. The input device 224 is coupled to the bus 220 for communication with the other components via signal line 259. The output device 222 is a display, speakers, vibration motor, etc. In one embodiment, the output device 222 is a speaker for outputting audio signals. The output device 222 is coupled to the bus 220 for communication with the other components via signal line 257.

Ghost Profile Application 103

Figure 2B:
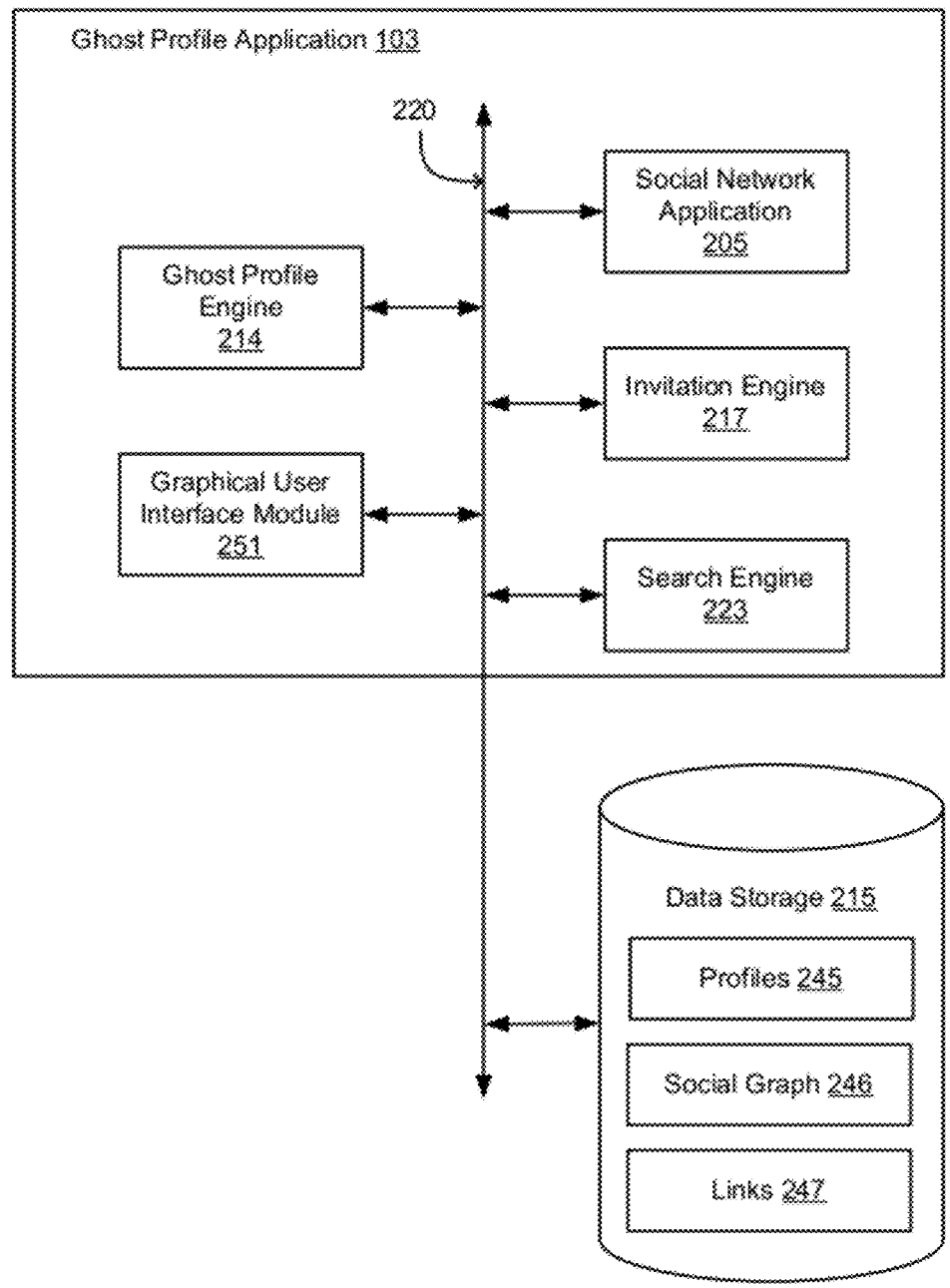
FIG. 2B is a block diagram of the ghost profiles application and the data storage according to one embodiment.

Turning now to FIG. 2B, one example of a ghost profile application 103 and data storage 215 are illustrated. In one embodiment, the ghost profile application 103 includes a social network application 205, a ghost profile engine 214, an invitation engine 217, a graphical user interface module 251 and a search engine 223 that are each coupled to the bus 220.

The social network application 205 is software including routines for generating a social network. In one embodiment, the social network application 205 is a set of instructions executable by the processor 213 to provide the functionality described below for registering a user, receiving user input, and generating a social network. In another embodiment, the social network application 205 is stored in the memory 221 of the computing device 200 and is accessible and executable by the processor 213 for maintaining posts, comments to posts, groups, etc. In either embodiment, the social network application 205 is adapted for cooperation and communication with the processor 213 and other components of the computing device 200 via signal line 220. The social network application 205 generates and updates a profile 245, a social graph 246 and links 247 to the profile uniform resource locator (URL) that are stored in the data storage 215.

The ghost profile engine 214 is software including routines for generating and managing ghost profiles. The ghost profile allows ghost profile users to perform certain functions in the social network without fully converting to a complete user profile. In one embodiment, the ghost profile engine 214 is a set of instructions executable by the processor 213 to provide the functionality described below for generating a ghost profile that is identifiable in the data storage 215 as a profile 245 but is not accessible through search or associated with a link 247. In another embodiment, the ghost profile engine 214 is stored in the memory 221 of the computing device 200 and is accessible and executable by the processor 213. In either embodiment, the ghost profile engine 214 is adapted for cooperation and communication with the processor 213 and other components of the computing device 200 via signal line 220.

For example, when a social network user invites a person to the social network and the person accepts, the ghost profile engine 214 generates a ghost profile for the person and adds the social network user that prompted the invitation as a friend. The ghost profile user is able to subsequently delete those friends. Once a friendship is established between the ghost profile user and the social network user, the ghost profile is visible in the invitee's friend grid. Other members, however, cannot see the ghost profile user in that friend grid. This is true even if the other member is also friends with the ghost profile user.

The ghost profile engine 214 allows ghost profile users to view profiles, comment on pictures and other posts that are shared with the ghost profile user, reply to private messages, opt-out of the digest and ask to not receive emails without having to join the social network. In one embodiment, the ghost profile engine 214 grants a social network user access to information about the user, such as the user's email address, full name, interests, etc. In one embodiment, the ghost profile user grants the social network user access and the ghost profile engine 214 provides the access without requiring the ghost profile user to join the social network. The ghost profile engine 214 also converts the ghost profile to a user account in response to a user's request. In one embodiment, the user's personal data is kept private by displaying a portion of the ghost profile user's identity on the social network, such as only a few letters of the username (e.g. the user's full name or the user's email address) so that friends of the ghost profile user will recognize the person but not the other members of the social network. A person of ordinary skill in the art will recognize that other methods of obfuscating the identity of a ghost profile user can also be applied.

In one embodiment, the ghost profile engine 214 does not allow ghost profile users to add friends to their profile. This avoids a situation where advertisers abuse the ghost profiles by using it as a means for distributing spam.

In one embodiment, social network users that are friends with a ghost profile user are able to send a post to the ghost profile user, refer to the ghost profile user (e.g. by using an "@ user), tag the ghost profile user in a photo, share an album with the ghost profile user, write a testimonial about the ghost profile user, call the "send a message" open social API and view limited information about the ghost profile user, such as an email address, a full name, etc. In one embodiment, the testimonial includes text, photos, audio and videos about the friend. The friend either accepts or rejects the testimonial. In another embodiment the testimonial is displayed on the profile for other friends to view. In one embodiment, the posts sent to the ghost profile user and references made to the ghost profile user are not visible when viewed by social network users that are not friends with the ghost profile user. In another embodiment, content such as comments made by the ghost profile user are displayed but the ghost profile user's name is obfuscated when viewed by social network users that are not friends of the ghost profile user.

In one embodiment, friends of the ghost profile user can make changes to the ghost profile. For example, friends can update the profile picture, fill in the full name and birthday and tag photos of the ghost profile user. The tagged photos are then presented to the ghost profile user as suggestions for the profile photo. The ghost profile is private and visible to the ghost profile user and the ghost profile user's friends.

In one embodiment, the ghost profile engine 214 also generates statistics that are used by an administrator to measure the performance of the ghost profiles. In one embodiment, the statistics include how many ghost profiles exist, how many users created ghost profiles, how many invitations the invitation engine 217 sent and how many unique email address were sent invitations, how many messages the ghost profile engine 214 sent, how many comments were received from ghost profiles and how many unique email addresses sent comments and how many ghost profile users converted to a social network profile.

The invitation engine 217 is software including routines for authenticating ghost profile users and transmitting invitations to users via the communication unit 271. In one embodiment, the invitation engine 217 is a set of instructions executable by the processor 213 to provide the functionality described below for receiving requests from members of the social network to invite a non-member to join the social network, authenticating the email address for the non-member and transmitting invitations to the non-member that contain a link to the social network and, in one embodiment, a summary of recent activities of the member on the social network (i.e. a digest). In one embodiment, authenticating the email address includes determining whether the email address is associated with the social network and, if not, the invitation engine 217 checks the ghost profile user's credentials in the email service. If the credentials are satisfactory, the invitation engine 217 generates a one-time token to provide one-time access to the link to the ghost profile. In one embodiment, the invitation contains an additional link for providing security options such as the option to view the recent activities on either a shared computer or a private computer. One of ordinary skill in the art would recognize that the invitation can be transmitted via any communication method including an email, a message via a Short Messaging Service (SMS), a message via an instant messaging service, a message via other social networks or simply a link in forums and blogs.

In the example where the invitation is an email to the non-member and the non-member is using an email address that is associated with the social network (e.g. Gmail for Google products) the link remains active and provides a means for repeatedly accessing the social network. If the email address is outside the social network, the invitation engine 217 generates a one-time token and the link only works the first time that the user clicks on it. If the ghost profile user selects the link a second time the invitation engine 217 sends a second one-time token and link in an invitation to the ghost profile user's email address. In another embodiment, the ghost profile engine 214 allows the ghost profile user to register a username and password after the user clicks the link to avoid having to generate multiple one-time links. In one embodiment, a non-member with an outside email address is prompted by the social network after the non-member clicks the link to establish a username and password for accessing the ghost profile in the future.

The graphical user interface module 251 is software including routines for generating a user interface. In one embodiment, the graphical user interface module 251 is a set of instructions executable by the processor 213 to provide the functionality described below for generating a user interface for displaying the social network, displaying the ghost profile, interacting with other users and converting to a social network user. In another embodiment, the graphical user interface module 251 is stored in the memory 221 of the computing device 200 and is accessible and executable by the processor 213 for maintaining posts, comments to posts, groups, etc. In either embodiment, the graphical user interface module 251 is adapted for cooperation and communication with the processor 213 and other components of the computing device 200 via signal line 220.

A member accesses the user interface generated by the user interface module 251 to view the social network. In one embodiment, the user interface includes an option for transmitting a ghost profile invitation to a user. The user interface module 251 transmits members' requests for ghost profiles to the ghost profile engine 214. Once the user receives an invitation from the invitation engine 217 and accepts the invitation, the graphical user interface module 251 generates a user interface for the ghost profile for the user. In one embodiment, the graphical user interface module 251 displays a partial name for ghost profile users instead of the full name so that the user's friends recognize the user's activities but other members do not recognize the user. In one embodiment, the user interface module 251 displays email addresses for user names and for ghost profile users the user interface module 251 displays an obfuscated email address.

The search engine 223 is software including routines for searching the data storage 215 for profiles 245 and links 247. In one embodiment, the search engine 223 is a set of instructions executable by the processor 213 to provide the functionality described below for retrieving search results, assigning a score of zero to the ghost profiles and filtering out the zero-scored ghost profiles. In another embodiment, the search engine 223 is stored in the memory 221 of the computing device 200 and is accessible and executable by the processor 213. In either embodiment, the search engine 223 is adapted for cooperation and communication with the processor 213 and other components of the computing device 200 via signal line 220.

In one embodiment, the search engine 223 renders ghost profiles invisible by declaring a flag to choose between filtering or not filtering ghost profiles and ghost URLs. In one embodiment, a check is done on a per-request basis by including a Boolean operator in the requests. Handlers are modified to exclude ghost profiles from their corresponding computations in examples such as the non-friends case. Below are examples of storage handlers that are affected by the ghost profile features:

handler_getfrienddistance
    handler_getfriends
    handler_getlink
    handler_getlinks
    handler_getreverselinks
    handler_getshortpaths
    handler_getuserdata In another embodiment, the data storage 215 indexes the ghost profiles with the other profiles 245 and the search engine 223 assigns a score of zero to the ghost profiles. As a result, a search query returns search results that include the ghost profiles. The search engine 223 then filters out the ghost profiles from the search results. In one embodiment, a field is added to the user's document to indicate that it is a ghost profile by modifying the code for document creation.

In one embodiment, the ghost profile engine 214 receives a confirmation once the user selects the link in the invitation and instructs the storage 215 to stores the ghost profile along with the regular profiles as a profile 245. One of ordinary skill in the art will recognize that the ghost profiles can be stored in separate location from the regular profiles.

In one embodiment, the ghost profile engine 214 assigns a unique identifier for the ghost profile once the ghost profile engine 214 receives the confirmation. This example is advantageous because it decreases the number of unique identifiers that are used, since a certain percentage of people will not click on the link. One of ordinary skill in the art will recognize, however, that the unique identifier could also be assigned at the time of creation of the ghost profile.

Figure 3:
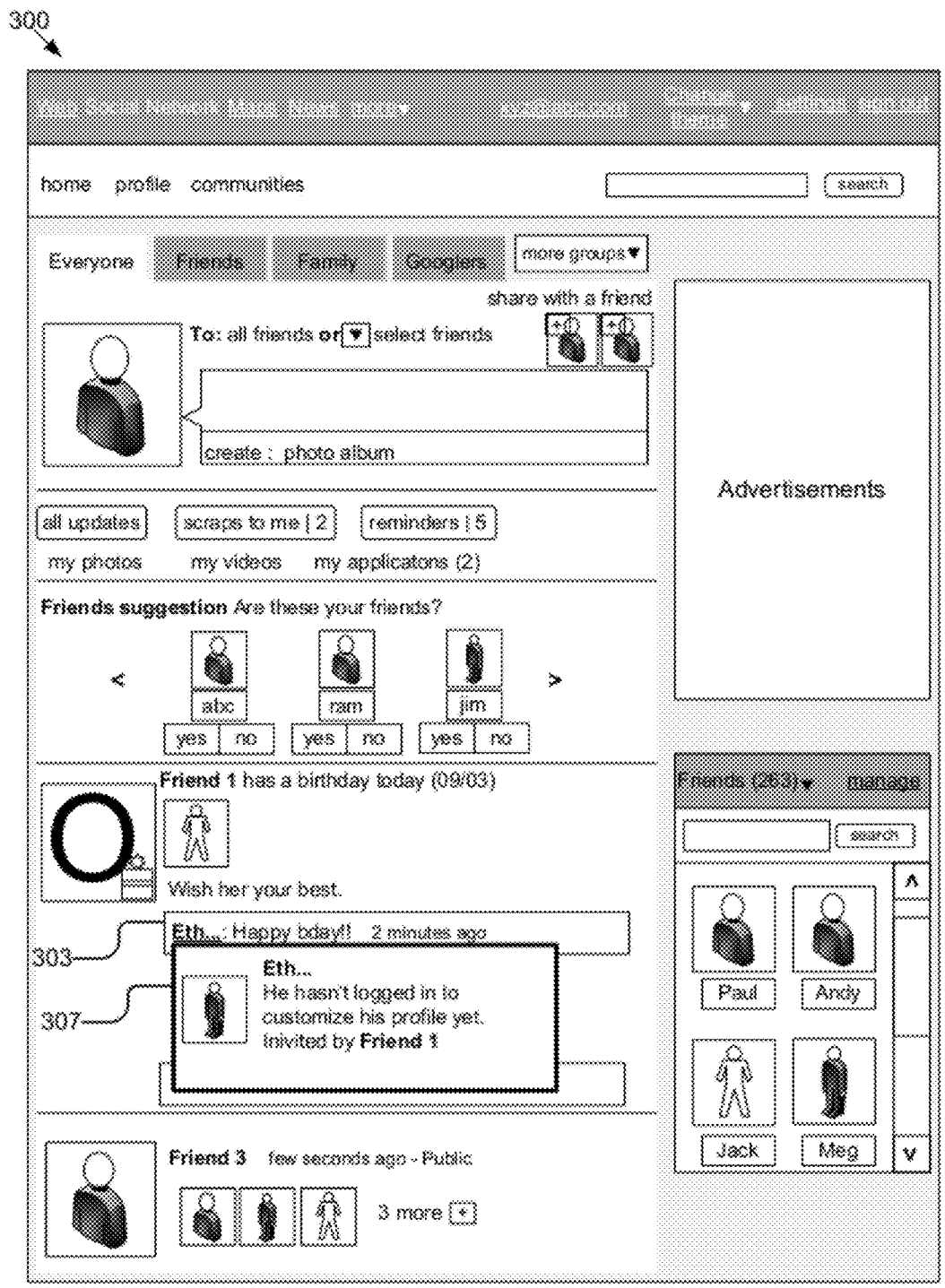
FIG. 3 is an illustration of how a social network appears to friends of a ghost profile user according to one embodiment.

FIG. 3 is an illustration 300 of how a social network appears to a member of the social network including friends of the ghost profile user. In the illustrated example, Ethan Smith is a ghost profile user. When the ghost profile user comments 303, only the first three letters of his name are contained on the page. This allows the ghost profile user's friends to recognize him but for him to remain anonymous to other social network users. When a member of the social network hovers over Ethan's name, a popup 307 appears that states that Ethan has not logged in to customize his profile.

Figure 4:
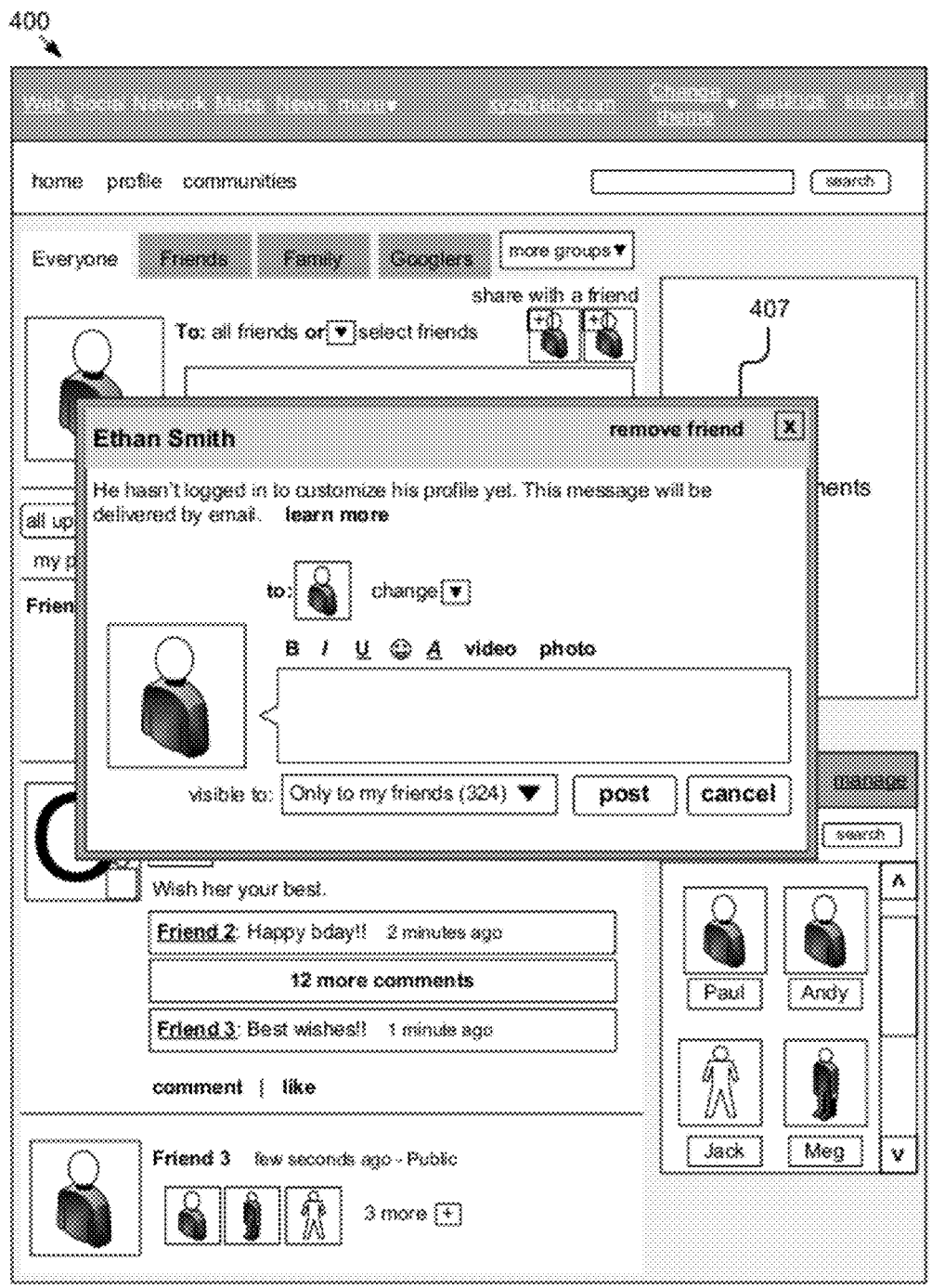
FIG. 4 is an illustration of a private message for communicating with a ghost profile user according to one embodiment.

FIG. 4 is an illustration 400 of a means for communicating with a ghost profile user. Since there is no ghost profile for members to view, clicking on the user name causes the social network to display a popup 407 for emailing the ghost profile user directly. In one embodiment, only friends can email the ghost profile user.

Figure 5:
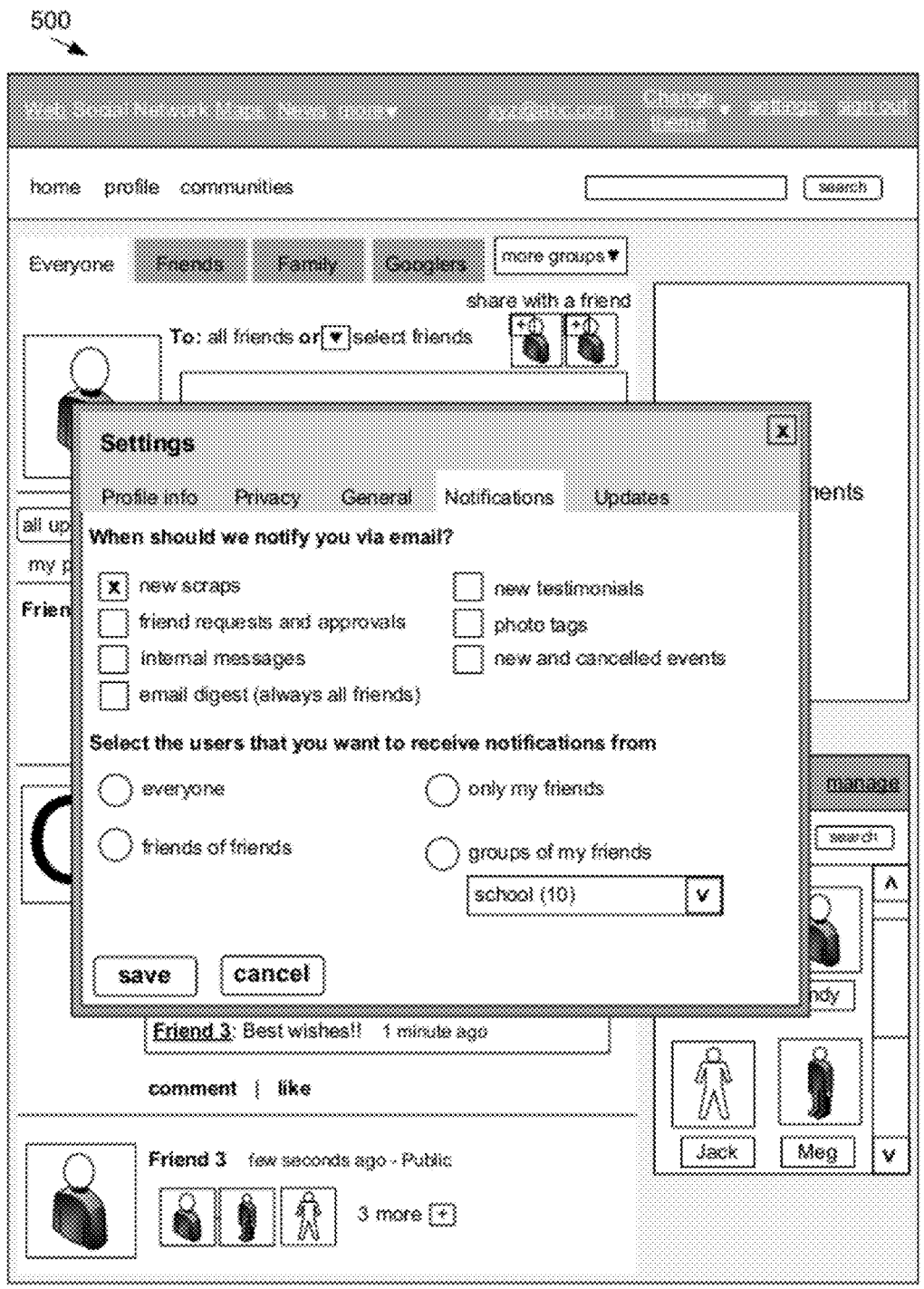
FIG. 5 is an illustration of an example of social network notification settings received by a friend of a ghost profile user.

FIG. 5 is an illustration 500 of an example of social network notification settings received by a ghost profile user. The settings allow the ghost profile user to specify types of notifications including (a) new scraps; (b) friend requests and approvals; (c) internal messages; (d) email digests; (e) new testimonials; (f) photo tags; and (g) new and cancelled events. The settings also allow the ghost profile user to specify different levels of notifications by distinguishing between notifications from (a) everyone; (b) friends of friends; (c) friends; and (d) groups of friends, such as family and school.

Figure 6:
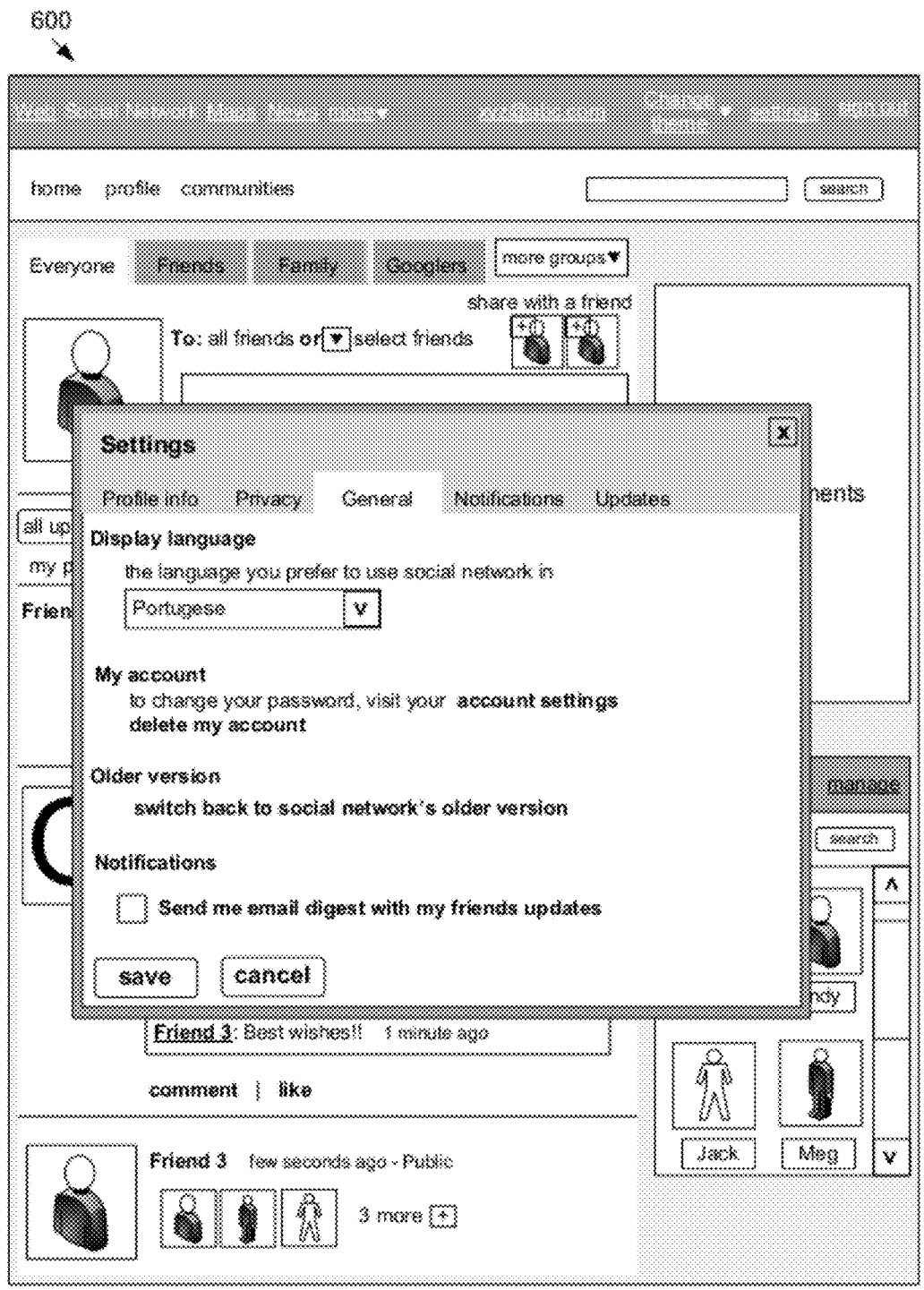
FIG. 6 is an illustration of an example of social network general settings received by a friend of a ghost profile user.

FIG. 6 is an illustration 600 of an example of general ghost profile user settings. A ghost profile user specifies a language for displaying content. The settings also allow the ghost profile user to switch back to an older version of the social network in the event that the ghost profile user is uncomfortable with new changes.

Figure 7:
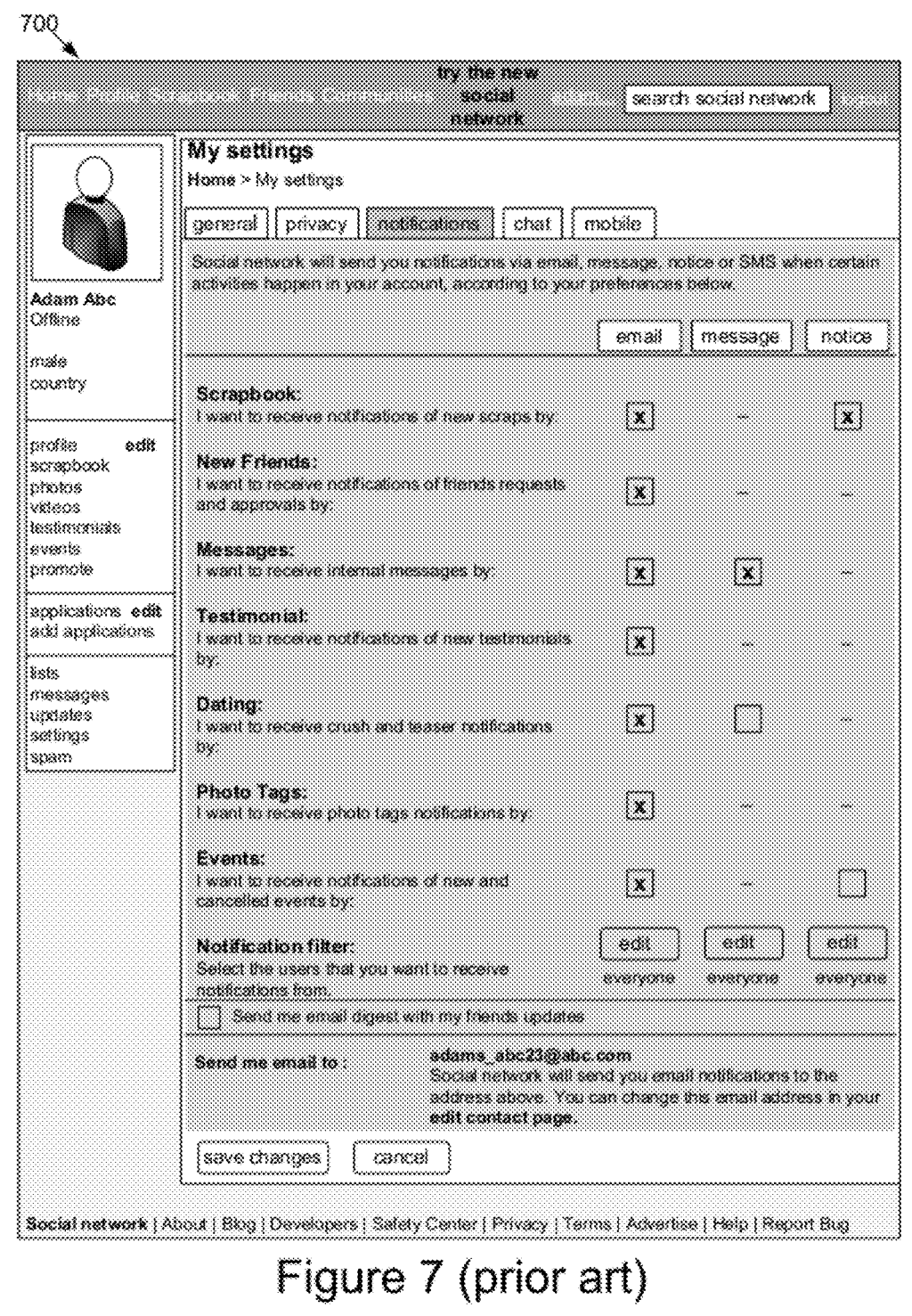

FIG. 7 is a prior art illustration 700 of how members of the social network view the notification settings. In this version, the member specifies how the notifications are received, such as via email, a message or a notice.

Figure 8:
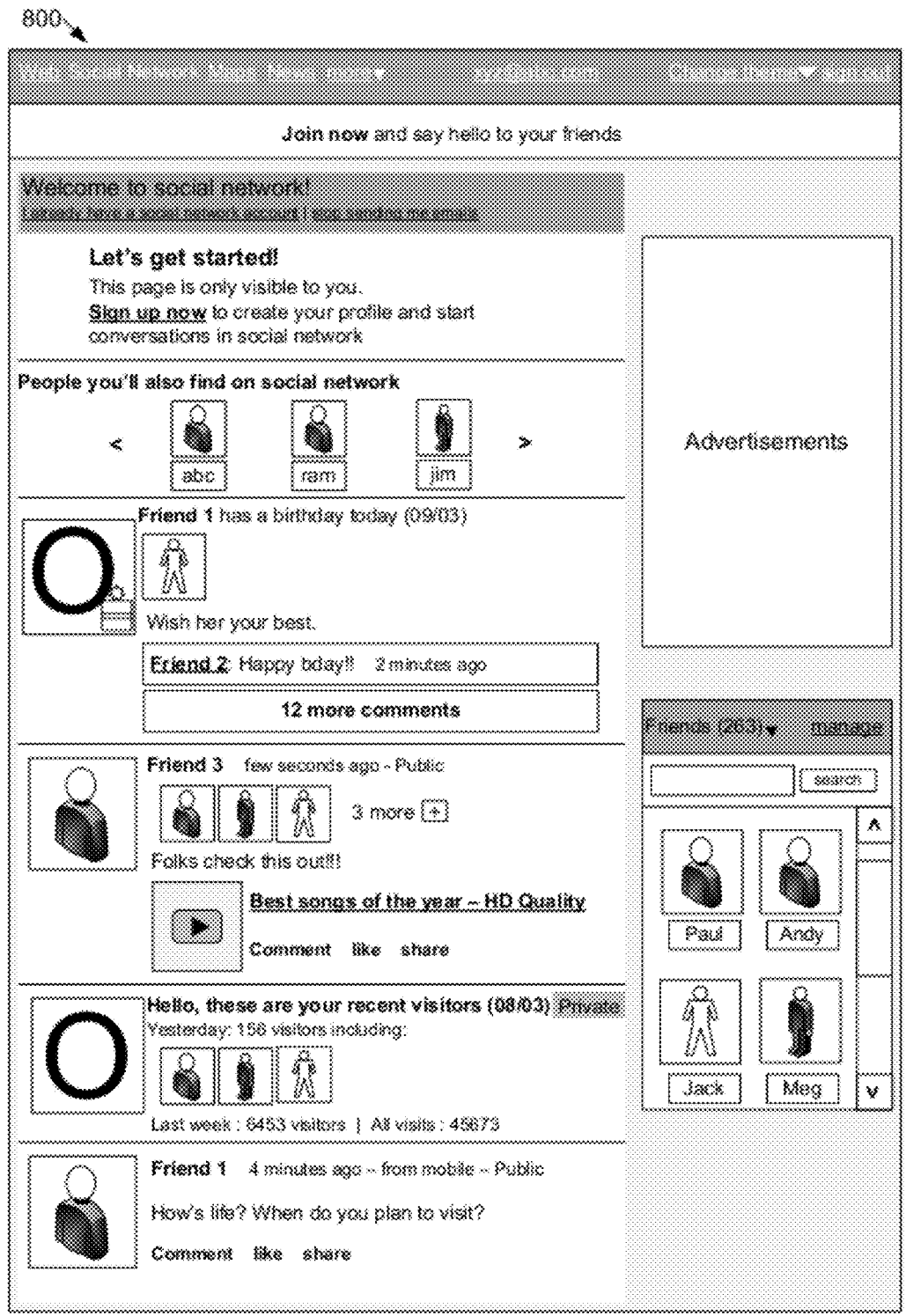
FIG. 8 is an illustration of landing page generated for a ghost profile user according to one embodiment.

FIG. 8 is an illustration 800 of the landing page that the graphical user interface module 251 generates for the ghost profile user after the ghost profile user receives an invitation and selects the link in the invitation. The invitation provides a mechanism for instantly joining and accessing the social network without having to create a regular profile. This format encourages the user to access the ghost profile because the invitation summarizes recent activities of the user's friends on the social network.

Figure 9:
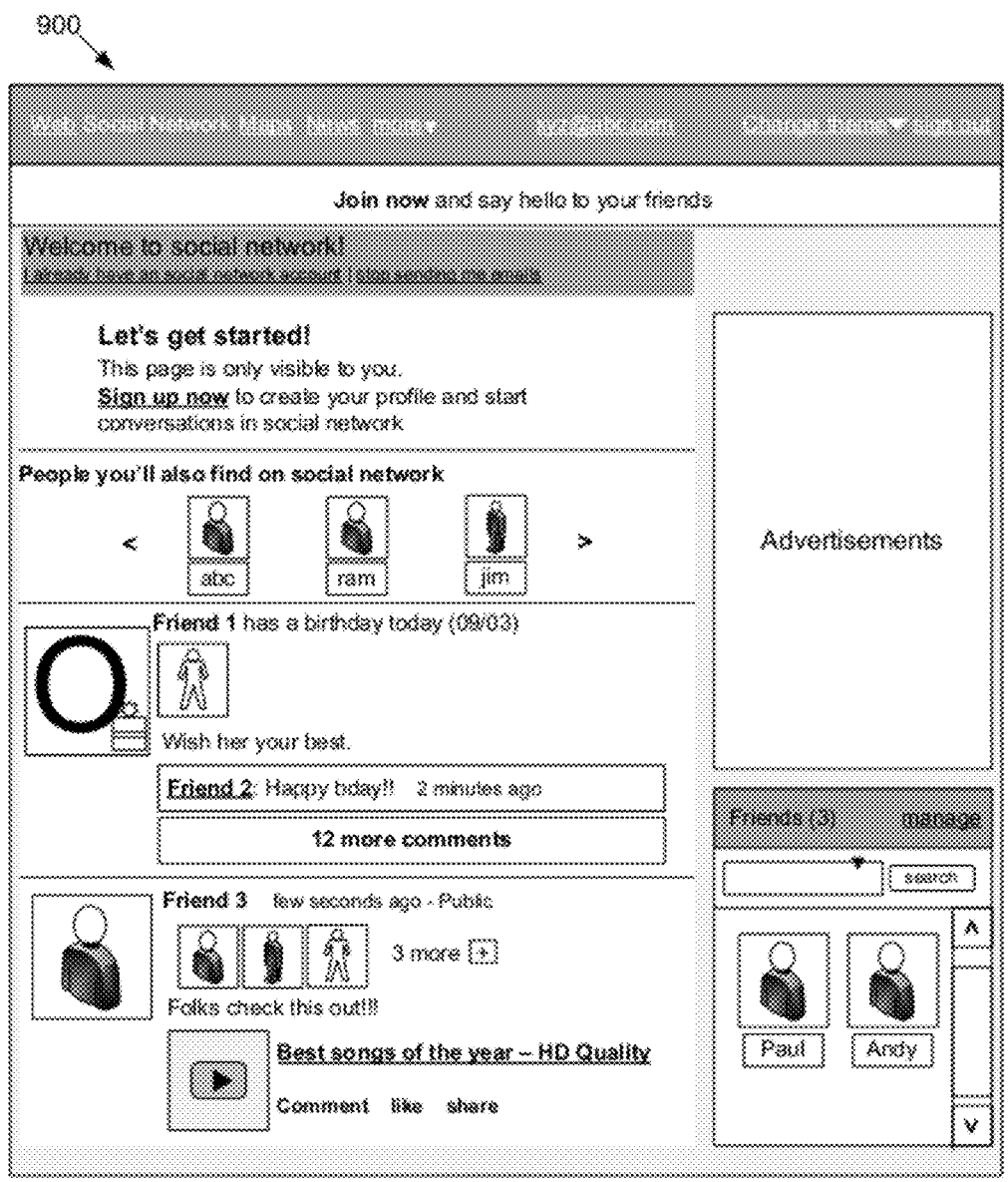
FIG. 9 is an illustration of another landing page generating for a ghost profile user according to one embodiment.

FIG. 9 is an illustration 900 of another embodiment of the landing page that the graphical user interface module 251 generates for the ghost profile user after the ghost profile user receives an invitation. In this example, the user interface includes fewer items because there are fewer friends and, therefore, fewer activities to report.

Figure 10:
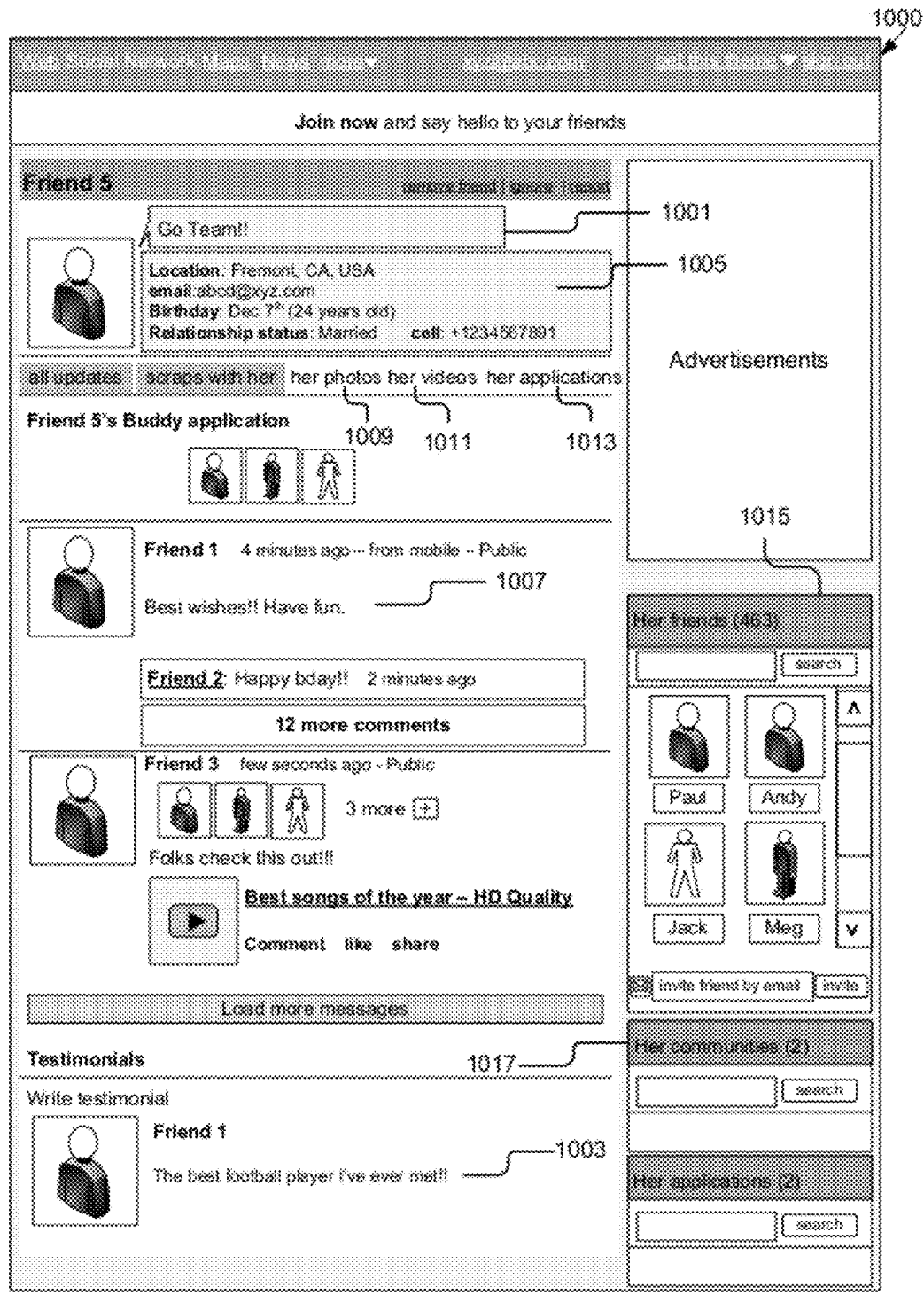
FIG. 10 is an illustration of a friend's profile in a social network according to one embodiment.

FIG. 10 is an illustration 1000 of how a friend's profile in a social network appears to the ghost profile user. All of the friend's information is visible to the ghost profile user. This includes posts on the friend's wall 1007, the list of friends 1015, status updates 1001, personal information 1005, photos 1009, videos 1011, testimonials 1003, communities 1017 and applications 1013.

FIG. 11 is an illustration 1100 of a non-friend profile in a social network. The information available to the ghost profile user is more restricted in the interest of maintaining privacy. The non-friend's list of friends, photos, videos and applications are visible. The ghost profile user is also able to choose to interact with the non-friend through a buddy poke 1107 or a private message 1109, but there is no option to friend her. In one embodiment, the ghost profile user has to become a member (i.e., sign up with the social network to create a regular profile) to friend users that didn't invite the ghost profile user to access the social network. The ghost profile user can become a member by clicking a link 1105 on the non-friend's profile.

FIG. 12 is an illustration 1200 of an email invitation sent by the invitation engine 217 to a non-member. In this example the invitation is a newsletter that summarizes recent activities of the members who requested the social network to invite the non-member. The newsletter functions as a periodic reminder that the user is not a member of the social network. The ghost profile user unsubscribes to the newsletter by selecting the unsubscribe link 1206. In one embodiment, the invitation also contains friend suggestions 1208 and birthday reminders 1210 that would further encourage the non-member to sign up with the social network.

FIG. 13 is an illustration 1300 of an email invitation sent by the invitation engine 217 to a non-member that provides additional security options. Specifically, this invitation states that the recent updates can be viewed on a trusted computer or a shared computer 1303.

FIG. 14 is an illustration 1400 of another embodiment of an email invitation sent by the invitation engine 217 to a non-member. The invitation engine 217 generates an invitation with links to friend updates instead of graphics. This example invitation is designed for users that prefer not to receive graphics-heavy invitations. The ghost profile user is still able to access the content and see the advantages of using the social network without having to experience a delay in loading the invitation because of graphics.

Figure 15:
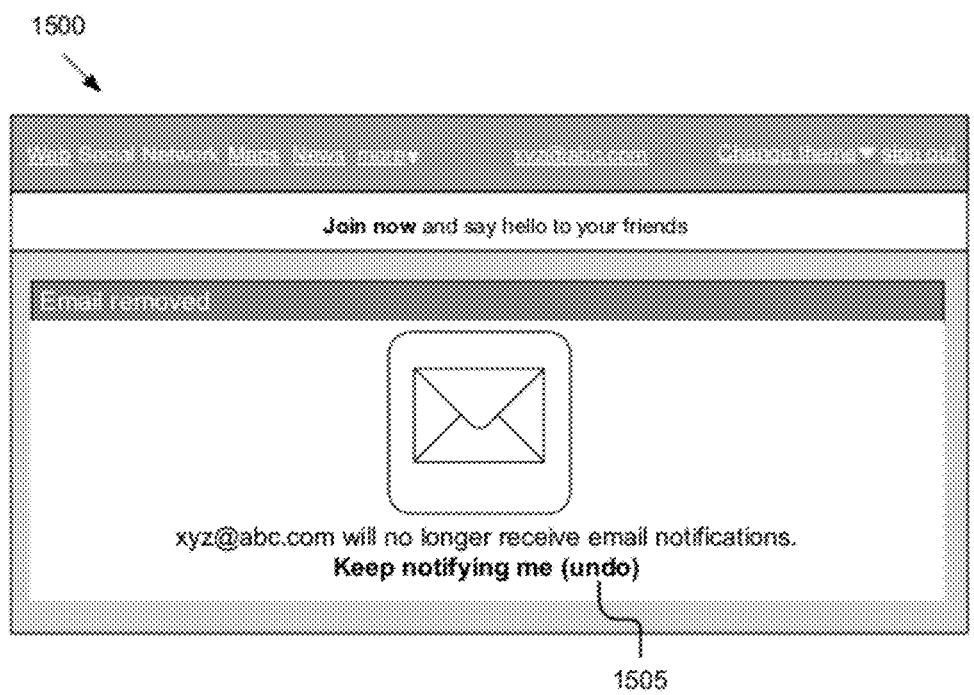
FIG. 15 is an illustration of a notification that a ghost profile user's email has been removed from a social network list according to one embodiment.

FIG. 15 is an illustration 1500 of a notification generated by the invitation engine 217 that a ghost profile user receives after requesting that the user be unsubscribed from an email mailing list. In one embodiment, a ghost profile user receives this notification by clicking a link such as 1204 or 1206 in FIG. 12 to request the social network to stop sending email notifications and newsletters. If the ghost profile user selected an unsubscribe link in error, selecting the undo link 1505 will reinstate the notifications.

Figure 16:
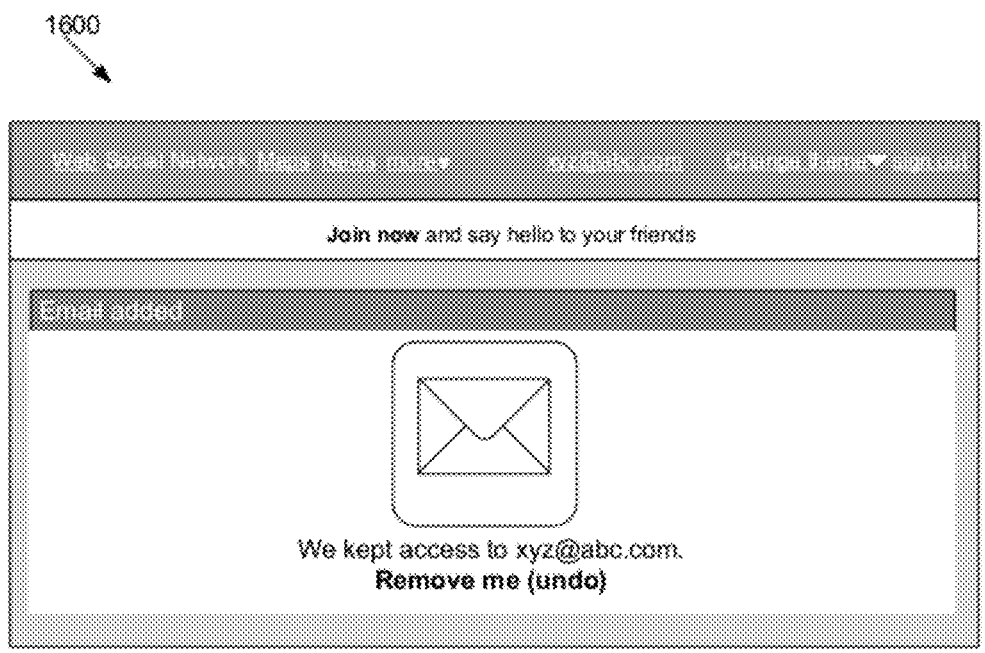
FIG. 16 is an illustration of a notification that a ghost profile user's email is still part of a social network list according to one embodiment.

FIG. 16 is an illustration 1600 of a notification generated by the invitation engine 217 that a ghost profile user receives after requesting that email be reinstated, for example, by clicking a link such as 1505 in FIG. 15.

Figure 17:
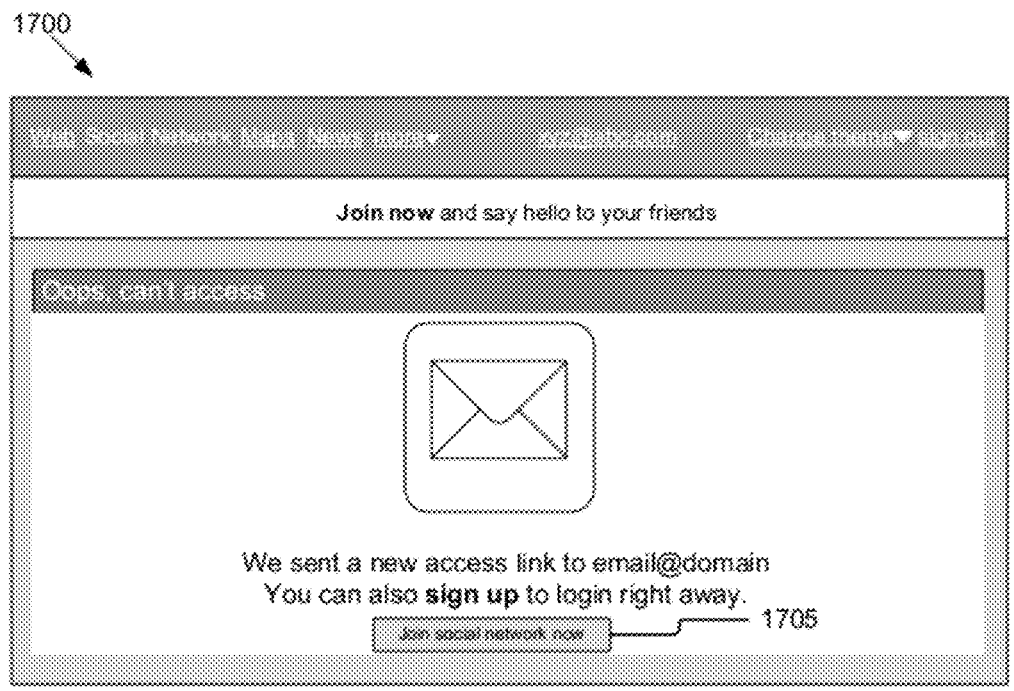
FIG. 17 is an illustration of a notification for accessing content on a social network according to one embodiment.

FIG. 17 is an illustration 1700 of a notification generated by the invitation engine 217 for accessing content on a social network. In one embodiment, the notification also consists of a link 1705 that the user clicks to convert the ghost profile to a member of the social network.

Methods

Figure 18:
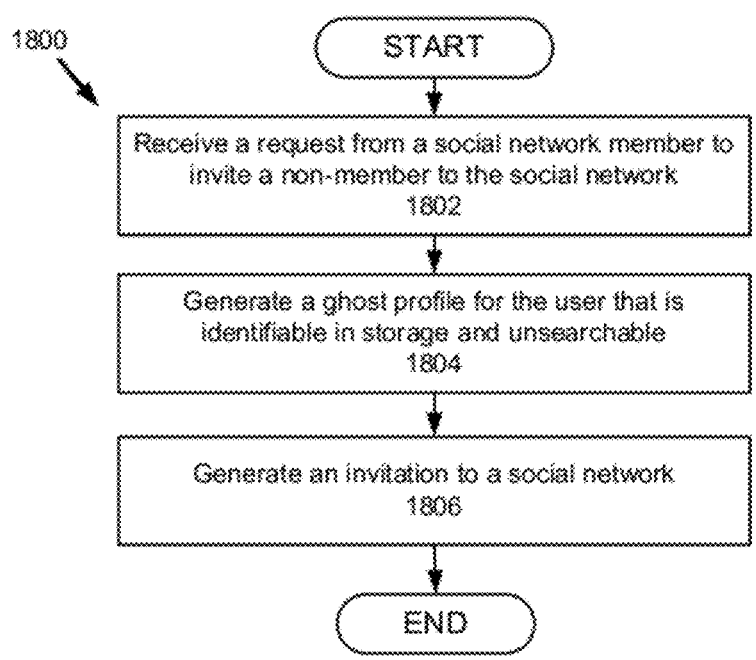
FIG. 18 is a flow chart illustrating steps for generating a ghost profile according to one embodiment.
Figure 19:
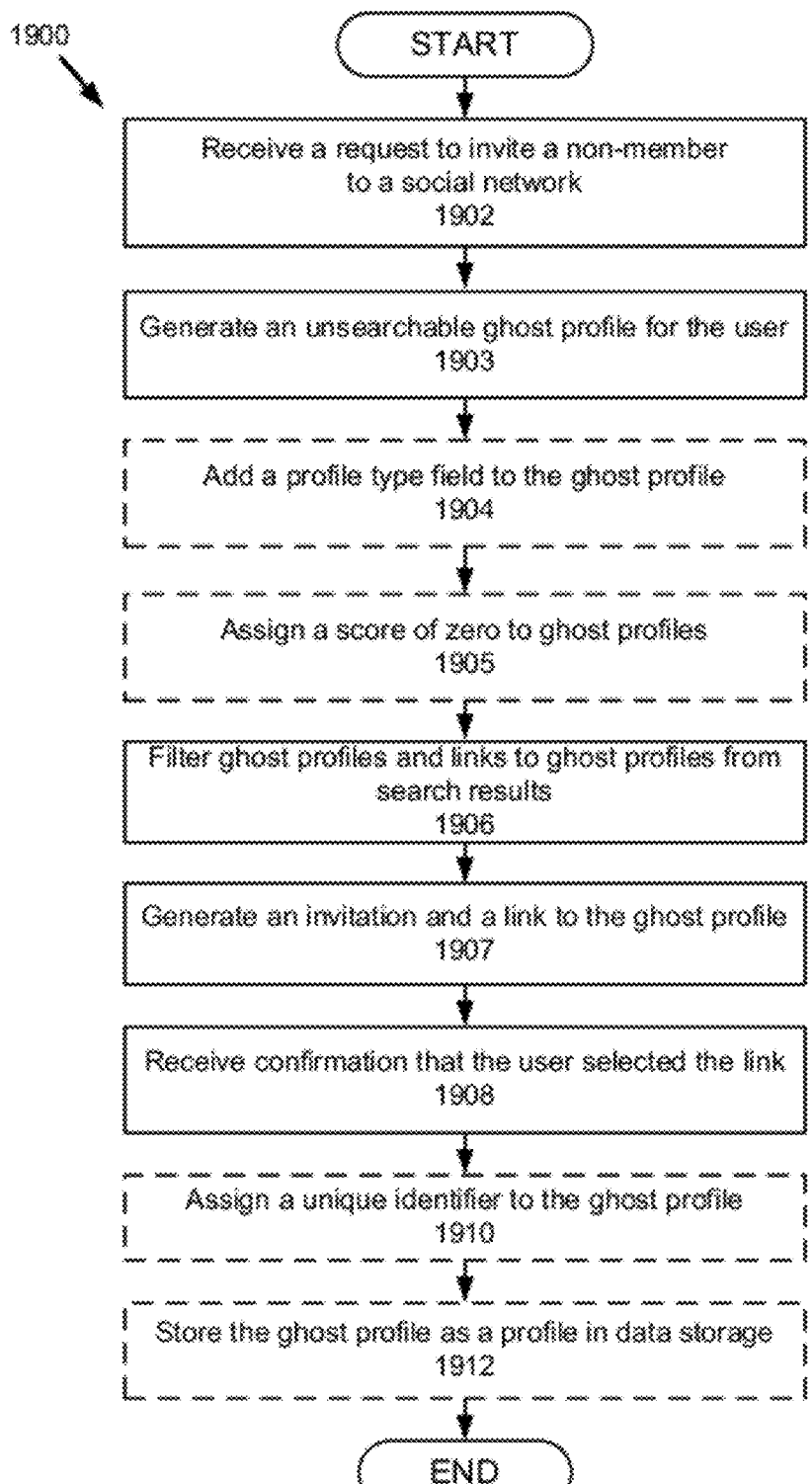
FIG. 19 is a flow chart illustrating more detailed steps for generating a ghost profile according to one embodiment.
Figure 20:
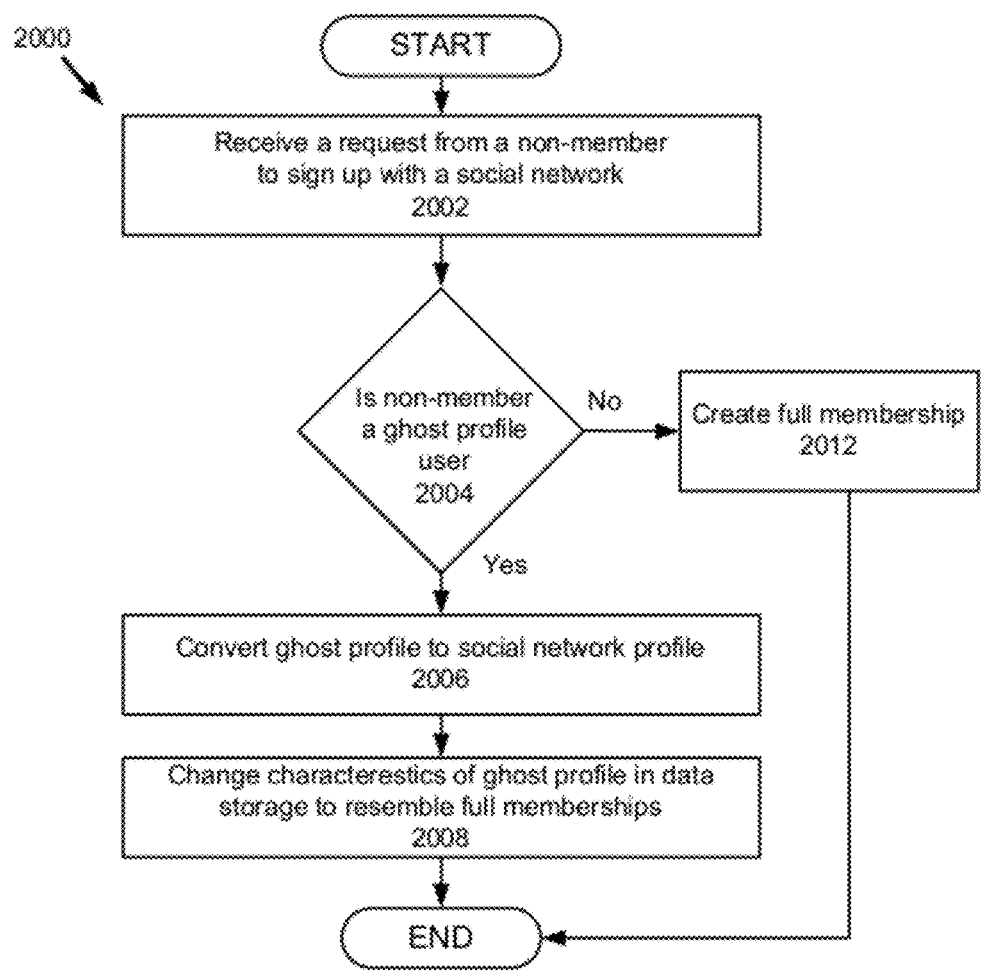
FIG. 20 is a flow chart illustrating steps for converting a ghost profile to a member of the social network according to one embodiment.

Referring now to FIGS. 18-20, various embodiments of methods for generating and managing ghost profiles will be described.

FIG. 18 is a flow chart 1800 illustrating steps for generating a ghost profile according to one embodiment. A social network application 205 receives 1802 a request from a social network member to invite a non-member to the social network. The social network application 205 transmits the request to the ghost profile engine 214, which generates 1804 a ghost profile for the user that is identifiable in storage and unsearchable. The ghost profile engine 214 transmits a notification to the invitation engine 217 that the ghost profile was generated. The invitation engine 217 generates and transmits via the communication unit 271 an invitation 1806 to the user to access the social network with a ghost profile.

FIG. 19 is a flow chart 1900 illustrating more detailed steps for generating a ghost profile according to one embodiment. A social network application 205 receives 1902 a request to invite a non-member to a social network. The social network application 205 transmits the request to the ghost profile engine 214, which generates 1903 an unsearchable ghost profile for the user. In one embodiment, the ghost profile engine 214 adds 1904 a profile type field to the ghost profile (e.g. by adding a field to the protocol buffer) so that the search engine 223 filters the ghost profiles according to the field. In addition to preventing users from searching for ghost profiles, this prevents the ghost profile from appearing as part of the social graph. The ghost profiles are stored as profiles 245 in the data storage 215.

When the search engine 223 performs a search of profiles, in one embodiment the search engine 223 assigned 1905 a score of zero to the ghost profiles. In another embodiment, the search engine 223 identifies the ghost profiles based on the new field. The search engine 223 filters 1906 ghost profiles and links to ghost profiles from the search results to prevent them from being served to a requesting user.

Once the ghost profile is created and stored, the invitation engine 217 generates 1907 an invitation and a link to the ghost profile on the social network and transmits the invitation, for example, by transmitting an email message via the communication unit 271. In one embodiment, the link stays active if the link is sent to an email address associated with an email service provided by the social network owner. In another embodiment, the link is active for the first click and is then deactivated.

Once the user selects the link, the ghost profile engine 214 receives 1908 a confirmation that the user selected the link. In one embodiment, the selection of the link triggers the ghost profile engine 214 to assign 1910 a unique identifier to the ghost profile and store 1912 the ghost profile as a profile 245 in the data storage 215. In one embodiment, the ghost profile is stored in the same location as member profiles.

FIG. 20 is a flow chart 2000 illustrating steps for converting a ghost profile to a member of the social network. The ghost profile engine 214 receives 2002 a request from a non-member to join a social network. The ghost profile engine 214 then determines 2004 whether the request is from a ghost profile user 2004. For example, the ghost profile engine 214 identifies the email address of the requesting user and transmits the email to the search engine 223, which determines whether any of the profiles 245 match the email address. If there is no match, the social network application 205 creates 2012 a regular profile. If yes, the ghost profile engine 214 converts 2006 the ghost profile to a social network profile. In one embodiment the step of conversion includes changing 2008 the field from a ghost profile to a social network profile. This will also result in the profile and links being searchable. The ghost profile friendships are retained during the conversion.

The foregoing description of the embodiments have been presented for the purposes of illustration and description. It is not intended to be exhaustive or to limit the description to the precise form disclosed. Many modifications and variations are possible in light of the above teaching. It is intended that the scope of the specification be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the description can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method for generating a ghost profile in a social network, the method comprising:
    receiving a request from a first member of the social network to invite a user to access the social network;
    generating the ghost profile for the user, the ghost profile being unsearchable;
    generating an invitation to the user that contains a link to the ghost profile;
    assigning a unique identifier to the ghost profile responsive to receiving a confirmation that the user selects the link;
    generating a first display of a portion of a username where at least one of the characters in the username is obfuscated so that the user's identity is recognizable by some of the members of the social network that know the user; and
    in response to receiving a selection of the portion of the username by the first member of the social network, generating a second display for communicating with the user for the first member, the second display being inaccessible to members of the social network that are unconnected to the user in the social network.

2. The method of claim 1 wherein generating the ghost profile includes adding a profile type field to the ghost profile.

3. The method of claim 1 further comprising assigning a score of zero to the ghost profile and filtering search results with a zero score, 4. The method of claim 1 further comprising retrieving search results and filtering the ghost profile from the search results.

5. The method of claim 1 further comprising receiving a reference to the user that is invisible to the members of the social network that are unconnected to the user in the social network.

6. The method of claim 1 wherein the ghost profile is visible to the first member and is invisible to the members of the social network that are unconnected to the user in the social network.

7. The method of claim 1 further comprising converting the ghost profile to a social network profile.

8. The method of claim 1 further comprising generating a friendship between the first member and the user.

9. The method of claim. 8, wherein the ghost profile prohibits friendships between the user and the members of the social network that are unconnected to the user in the social network.

10. The method of claim 1, wherein the invitation includes a one-time token and the link is accessible for a first click.

11. A system for generating a ghost profile in a social network, the system comprising:
    one or more processors;
    a ghost profile engine stored on a memory and executable by the one or more processors, the ghost profile engine configured to receive a request from a first member of the social network to invite a user to access the social network, to generate the ghost profile for the user, the ghost profile being unsearchable, and to assign a unique identifier to the ghost profile responsive to receiving a confirmation that the user selects a link contained in an invitation;
    an invitation engine coupled to the ghost profile engine and stored on the memory and executable by the one or more processors, the invitation engine configured to generate the invitation to the user that contains the link to the ghost profile; and
    a graphical user interface module coupled to the ghost profile engine and stored on the memory and executable by the one or more processors, the graphical user interface module configured to generate a first display of a portion of a username where at least one of the characters in the username is obfuscated so that the user's identity is recognizable by some of the members of the social network that know the user, in response to receiving a selection of the portion of the username by the first member of the social network, to generate a second display for communicating with the user for the first member, the second display being inaccessible to members of the social network that are unconnected to the user in the social network.

12. The system of claim 11 wherein the ghost profile engine generates the ghost profile by adding a profile type field to the ghost profile.

13. The system of claim 11 further comprising a search engine coupled to the ghost profile engine, the search engine for assigning a score of zero to the ghost profile and for filtering search results with a zero score.

14. The system of claim 11 further comprising a search engine coupled to the ghost profile engine, the search engine for retrieving search results and filtering the ghost profile from the search results.

15. The system of claim 11 wherein the ghost profile engine receives a reference to the user that is invisible to the members of the social network that are unconnected to the user in, the social network.

16. The system of claim 11 wherein the ghost profile is visible to the first member and is invisible to the members of the social network that are unconnected to the user in the social network.

17. The system of claim 11, wherein the ghost profile engine converts the ghost profile to a social network profile.

18. The system of claim 11, wherein the ghost profile generates a friendship between the first member and the user.

19. The system of claim 11, wherein the ghost profile prohibits friendships between the user and the members of the social network that are unconnected to the user in the social network.

20. The system of claim 11, wherein the invitation includes a one-time token and the link is accessible for a first click.

21. A computer program product comprising a non-transitory computer useable medium including a computer readable program, wherein the computer readable program when executed on a computer causes the computer to:

receive a request from a first member of a social network to invite a user to access the social network;

generate the ghost profile for the user, the ghost profile being unsearchable;

generate an invitation to the user that contains a link to the ghost profile;

assign a unique identifier to the ghost profile responsive to receiving a confirmation that the user selects the link;

generate a first display of a portion of a username where at least one of the characters in the username is obfuscated so that the user's identity is recognizable by some of the members of the social network that know the user; and in response to receiving a selection of the portion of the username by the first member of the social network, generate a second display for communicating with the user for the first member, the second display being inaccessible to members of the social network that are unconnected to the user in the social network.

* * * * *